US007649718B1

(12) United States Patent
Edwards

(10) Patent No.: US 7,649,718 B1
(45) Date of Patent: Jan. 19, 2010

(54) FLEX CIRCUIT DAMPENER FOR REDUCTION OF SEEK INDUCED VIBRATIONS IN A DISK DRIVE

(75) Inventor: John Robert Edwards, Mountain View, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1028 days.

(21) Appl. No.: 11/102,503

(22) Filed: Apr. 8, 2005

Related U.S. Application Data

(60) Provisional application No. 60/560,831, filed on Apr. 8, 2004.

(51) Int. Cl.
*G11B 5/54* (2006.01)
(52) U.S. Cl. .................................... 360/264.2
(58) Field of Classification Search ............. 360/264.2, 360/264.4, 97.01, 266.3
See application file for complete search history.

(56) References Cited

U.S. PATENT DOCUMENTS

| 5,130,895 | A | * | 7/1992 | Somemiya et al. ........... 361/749 |
| 5,818,667 | A | * | 10/1998 | Larson .................... 360/264.2 |
| 5,907,452 | A | * | 5/1999 | Kan ........................ 360/97.01 |
| 5,953,183 | A | * | 9/1999 | Butler et al. ............. 360/264.2 |
| 6,934,126 | B1 | * | 8/2005 | Berding et al. ........... 360/264.2 |
| 6,937,442 | B2 | * | 8/2005 | Zhao et al. ............... 360/264.2 |
| 7,271,345 | B2 | * | 9/2007 | Freeman et al. .......... 174/117 F |
| 7,414,813 | B2 | * | 8/2008 | Huynh .................... 360/264.2 |

* cited by examiner

*Primary Examiner*—Angel A. Castro
(74) *Attorney, Agent, or Firm*—Westman, Champlin & Kelly

(57) ABSTRACT

The present invention is a dampening device for a flex circuit of a disk drive. The dampening device engages the flex circuit to alter is vibrational effect generated by the moment of the flex circuit that adversely affects post seek oscillations performance of the drive. The dampening device lowers the first resonant frequency of the flex circuit and reduces the magnitude of the post seek off track oscillations.

30 Claims, 11 Drawing Sheets

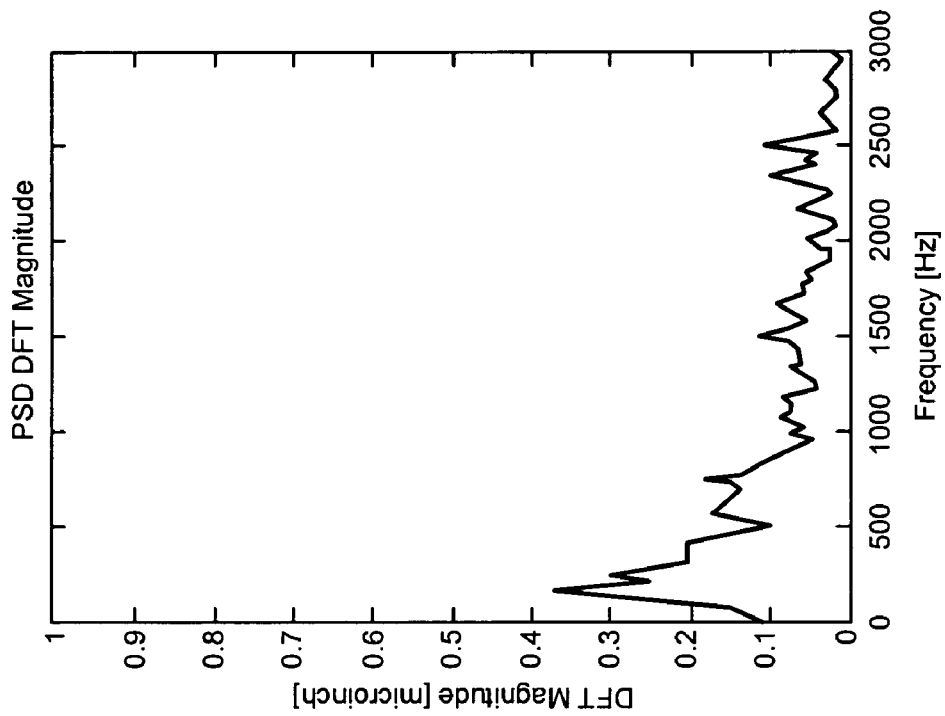
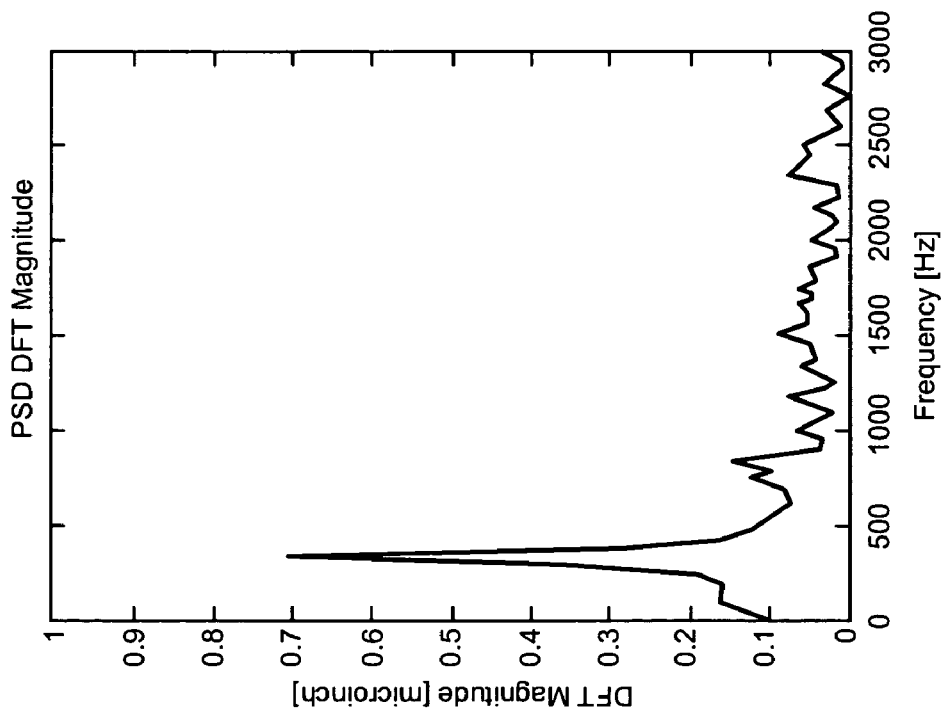

FLEX CIRCUIT DAMPENER FOR REDUCTION OF SEEK INDUCED VIBRATIONS IN A DISK DRIVE

CROSS-REFERENCE TO RELATED APPLICATIONS

This application claims the benefit of U.S. Provisional Patent Application Ser. No. 60/560,831, filed Apr. 8, 2004, which is incorporated by reference in its entirety herein.

FIELD OF THE INVENTION

The present invention relates to the reduction of vibrational loads imparted upon an actuator in a disk drive as a result of a seek operation. In particular, one embodiment of the invention dampens vibrational inputs originating from a flex circuit interconnected to the actuator to reduce post seek oscillation levels resulting in improved seek performance.

BACKGROUND OF THE INVENTION

Hard disk drives store information on magnetic disks. Typically, the information is stored on concentric tracks of the disk that are divided into servo sectors and data sectors. Information is written to or read from the disk by a transducer or head, mounted on an actuator arm that positions the transducer over the disk in a predetermined location. Accordingly, the movement of the actuator arm allows the transducer to access the different tracks of the disk. The disk is rotated by a spindle motor at a high speed, allowing the transducer to access different sectors within each track on the disk.

A voice coil motor (VCM) in combination with a servo control system is usually employed to position the actuator arm. The servo control system generally performs the function of seek control and track following. The seek function is initiated when a command is issued to read data from or write data to a target track on the disk. Once the transducer has been positioned sufficiently close to the target track by the seek function of the servo control system, the track following function of the control system centers and maintains the transducer on the target track until the desired data transfer is completed.

Typically, the transducer will oscillate about the center line of the target track for a period of time following the transition of the servo control system from the seek mode to the track following mode. These off-track displacements, or post-seek oscillations (PSO), are due, at least in part, to mechanical vibrations generated by the components of the disk drive during the seek and/or tracking operation. In addition, while in the track following mode, adjustments to the position of the transducer with respect to the center line of the target track are often required due to these same mechanical vibrations. Such adjustments are required to correct drift in the position of the transducer relative to the target track. The precise control of the position of the transducer relative to a target track has become increasingly important as track densities (or tracks per radial inch —TPI) in disk drives have increased. More specifically, the number of tracks included on a disk, i.e., the greater the TPI, translates to higher data storage capability. However, the increased number of tracks means that there is a more stringent requirement that the transducer stay on track for both reading and writing purposes as the separation distance between adjacent tracks decreases. A measure of how far the transducer is off target is termed "Track Misregistration" (TMR). It can be measured in distance (e.g., microns) or as a percentage of track pitch. TMR is also referred to as off track or track following errors.

The actuator assembly also includes a flex circuit that extends from a flex circuit connector mounted to the base plate and electrically interconnected with the disk drive printed circuit board, across a length of the base plate to the actuator, along the actuator arm and suspension and to the transducer for the transfer of information between the transducer and processors located on the printed circuit board. The flex circuit comprises a plurality of conductors or traces embedded in a flexible polyamide material, such as Kapton, that allows the flex circuit to deflect to accommodate the rotary movement of the actuator.

The actuator assembly generally includes one or more actuator arms and a corresponding load beam and slider for each actuator arm, along with the previously described transducer and a single flex circuit which generates vibrational loads that impair the ability of the actuator assembly to position and maintain the transducer over a desired track. The actuator assembly also includes a yoke and voice coil that can also contribute to the vibrational loads. To account for vibrational loads, during the design phase, the amount of vibration from the assembled components may be assigned a budget that must not exceed a predetermined level of generated vibration, thus minimizing TMR and post seek oscillation errors. These budgets are based upon vibrations originating from a number of sources and take on various forms including, but not limited to, electrical noise torque, whirl, arm mode, drum mode, ball bearing tones, high frequency turbulence, disk vibration, aerodynamic torque, and external vibration or seek settle. More specifically, the vibrational loads are generated by the different modes of vibrational motion generated by the components of the actuator assembly. Minute vibrational loads that emanate from the aerodynamic loading of the disk and/or actuator moving through the air inside the disk drive housing may also affect TMR and post seek oscillations. Thus, it is important for designers of disk drives to reduce the individual sources of vibrational loads that influence positioning of the transducer to produce a disk drive with lower vibrational loading such that the servo control system may better compensate for post seek oscillations and TMR.

In addition to the post seek oscillations generated by the components of the actuator assembly, post seek oscillations are also caused by the acceleration and deceleration of the actuator assembly as the actuator arm(s) moves from one track to its intended track. The flex circuit in effect places a torque loading on the actuator assembly. As the actuator moves, resonances in the flex circuit are exited. The primary or first resonant mode is the most distinctive in that it causes the greatest torque disturbance. This is because it is a low frequency resonance, on the order of 200-400 Hz. The magnitude or amplitude of the vibration caused by the flex circuit torque loading is also a problem in PSO. Other sources of post seek oscillation will be apparent to one skilled in the art, such as those from the interaction between various components, such as the bearing and the actuator when the actuator slows or stops the flex circuit and the actuator, rotation of the disk, or the interaction of the voice coil motor with the driver.

The negative effects of post seek oscillations and TMR are most easily described by a brief discussion of track pitch. The distance between two concentric tracks of a disk is known as track pitch, which decreases as TPI increases. For example, a disk with 100,000 TPI has generally a track pitch budget of 0.25 microns (approximately 10 millionths of an inch), wherein a disk with a 150,000 TPI has a track pitch of about 0.17 microns (approximately 7 millionths of an inch). As described above, each vibration-generating component of a disk drive has a budget that contributes to the maximum allowable TMR that are correctable by the servo control system. That is, vibrational induced oscillations of the transducer must be maintained at or below a level where the servo controller can effectively counteract the movement and control the position of the transducer. This level is predetermined in the design of a disk drive. Returning now to the above example in which TPI is increased from 100,000 to 150,000, and the same servo controller is used in each instance, vibrations generated by the flex circuit increase as a percentage of the total budget. Therefore, it is desirable to implement other means of reducing vibrations due to the flex circuit other than through the servo controller.

SUMMARY OF THE INVENTION

Thus, it is a long felt need in the field of magnetic disk drive construction to provide a device and method that reduces errors from post seek oscillations of the transducer head by dampening the vibrational loads generated by the flex circuit. The following disclosure describes a dampening mechanism that interfaces with the flex circuit of a disk drive actuator arm to reduce the vibrations emanating therefrom. More specifically, the flex circuit of many disk drives is interconnected to a flex clamp that is situated on or near an electrical connector that interconnects the flex circuit with the printed circuit board of the disk drive that, in turn, is interconnected with a computer system. The flex clamp is generally a molded plastic member that secures a portion of the flex circuit to the electrical connector. The flex circuit extends from the flex clamp and travels in a curved or arcuate path to the actuator, thereby providing slack and accommodating free movement of the actuator.

One embodiment of the present invention is a spring-like mechanism that interconnects with the clamp to engage one portion of the flex circuit, thus providing dampening to help lower the first resonant mode or natural frequency of the flex circuit. In one embodiment of the present invention, the flex circuit dampener is inserted between the flex circuit and a wall of the flex clamp to provide a spring similar to that of a leaf spring. More specifically, this embodiment of the present invention provides a flexible surface that engages the flex circuit to provide localized dampening by deflectional and frictional loading of the surface of the flex circuit, thus removing vibrational energy from the flex circuit.

One skilled in the art will appreciate that many types of dampeners may be employed without departing from the scope of the invention, such that many shapes or sizes of various types of materials may be employed. The aim of all of the embodiments of this invention is to provide a dampener placed in contact with the flexing portion of the flex circuit, which is typically but not necessarily located between the actuator assembly and the flex clamp. In operation, a dampener of a specific range of stiffness and dampening values may effectively modify the mechanical response of a flex circuit during a seek operation and reduce the reaction of forces or torques exerted on the actuator by the flex circuit that results in post seek oscillations that, in turn, reduce seek time performance. Both the dimensional and material properties of the dampener are important for achieving the correct stiffness and dampening properties of the dampener. Similarly, the dimensional and material properties of the flex circuit are also relevant for achieving the correct stiffness and dampening properties of the dampener. The flex circuit dampener may be a rectangular piece of material that is interconnected to the wall of the flex clamp, thus making the present invention easy to retrofit into existing designs of disk drives. In one embodiment of the present invention, the flex dampener is a rectangular piece of Kapton 75 microns thick and about 35 millimeters in height that is positioned between the flex clamp and the flex circuit.

The flex circuit dampener is used to modify the frequency response of the flex circuit by modifying its natural frequencies. More specifically, the flex circuit dampener alters the natural frequencies of the flex circuit such that resonance of the flex circuit occurs at a lower frequency range such that the servo control system of the disk drive can more effectively compensate for and correct PSO from the flex circuit. In addition, the flex circuit dampener reduces the magnitude of the resonant frequencies, especially the first mode frequency, which is the most prominent and which causes the most vibrational loading on the actuator assembly. Further, tests in connection with one embodiment of the present invention have shown an approximately 30% reduction in the first mode natural frequency and about a 50% decrease in overall amplitude of the resonant frequencies. The flex circuit dampener may be constructed of a polyamide material with a natural frequency of about 300 Hz. In addition, it has been found that the most effective dampening of the flex circuit occurs when the stiffness of the dampener approaches the stiffness of the flex circuit.

The natural frequency shift of the flex circuit is important because generally a servo mechanism that controls the actuator is more apt to compensate for external disturbances generated from vibrations at lower frequencies. Thus, when the natural frequency of an external vibration driver, such as the flex circuit, is reduced, the servo controller will more easily counteract the vibrational loading. This concept is often referred to in the art as the sensitivity function of the disk drive, such that a certain frequency range results in inefficient or non-existent servo control. Further, in those instances where the servo controller cannot counteract the external vibrational loads, the constant engagement of the servo mechanism may actually amplify external disturbances to maintain or increase the post seek oscillation errors.

In addition, the present invention also promotes coulomb dampening, which is generated by sliding friction between flex circuit and flex circuit dampener to further dampen vibrational loading emanating from the moving flex circuit. It has been found through experimentation and analysis that the most efficient coulomb dampening is achieved when the stiffness of the dampener is the same or nearly the same as the flex circuit stiffness and provided the contact between the flex circuit and the dampener over a predetermined region is such that the frictional interaction is optimized.

One skilled in the art will appreciate that the dampening method of the present invention provides an easy way for manufacturers to reduce the amplitude and shift the natural frequency of the flex circuit such that the servo controller can more efficiently compensate for the vibrations generated by the flex circuit, thus allowing the flex circuit to meet its post seek oscillation and/or tracking error budget. One skilled in the art will also appreciate that the present invention is easy to implement into existing disk drives. This retrofitability allows the present invention to be implemented in disk drives in a relatively inexpensive manner.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

FIG. 7A is a graph showing the frequency magnitude of an undampened actuator arm;

FIG. 7B is a graph showing the frequency magnitude of a dampened actuator arm that shows the effect that the dampener of one embodiment of the present invention has on post seek oscillation of an actuator arm;

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION

Figure 1:
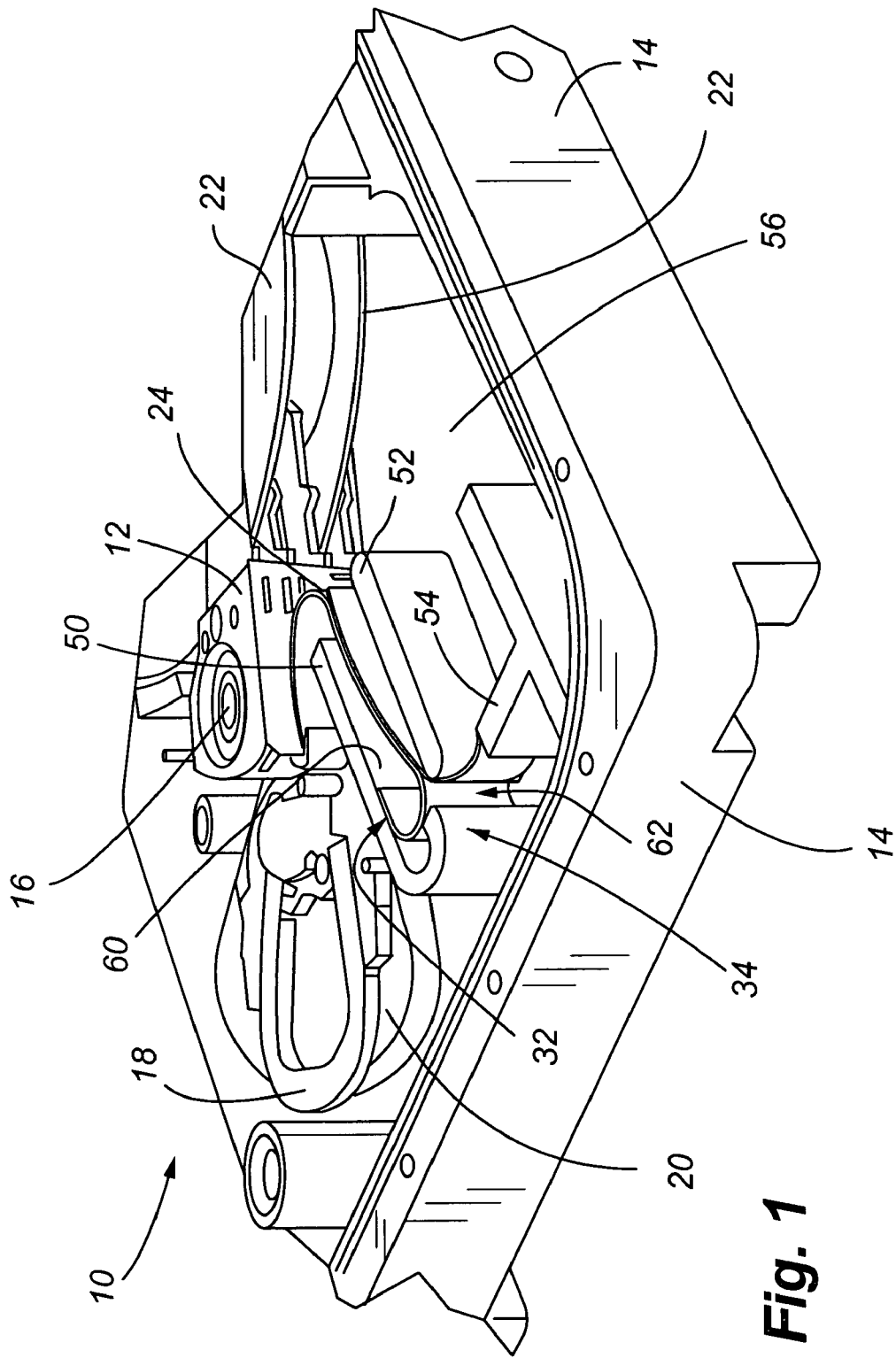
FIG. 1 is a partial perspective view of a disk drive with the cover removed.

Referring now to FIGS. 1-6, a disk drive and flex circuit dampening device is shown. More specifically, in FIG. 1, a partial view of a disk drive 10 is shown. An actuator assembly 12 is connected to a base plate 14 and rotates about a pivot 16. A voice coil 18, in combination with a pair of permanent magnets 20, only one of which is shown, causes rotary movement of the actuator assembly 12 relative to spinning disk 22. A flex circuit 24 supplies energy to the voice coil. The flex circuit 24 is also the primary path for transmitting data between a transducer or head 26, positioned at the distal end of each actuator arm 28 (FIG. 2), and a printed circuit board typically mounted on the opposite side of the base plate 14 as shown in FIG. 1 (not shown). The flex circuit 24 contains a plurality of electrical traces (not shown) that interconnect the transducer and voice coil to the various processors and other components on the printed circuit board. The electrical traces interface with a connector which interconnects the traces and the printed circuit board. The opposite end of the flex circuit 24 is connected to the actuator assembly 12 via a connector 32.

Figure 2:
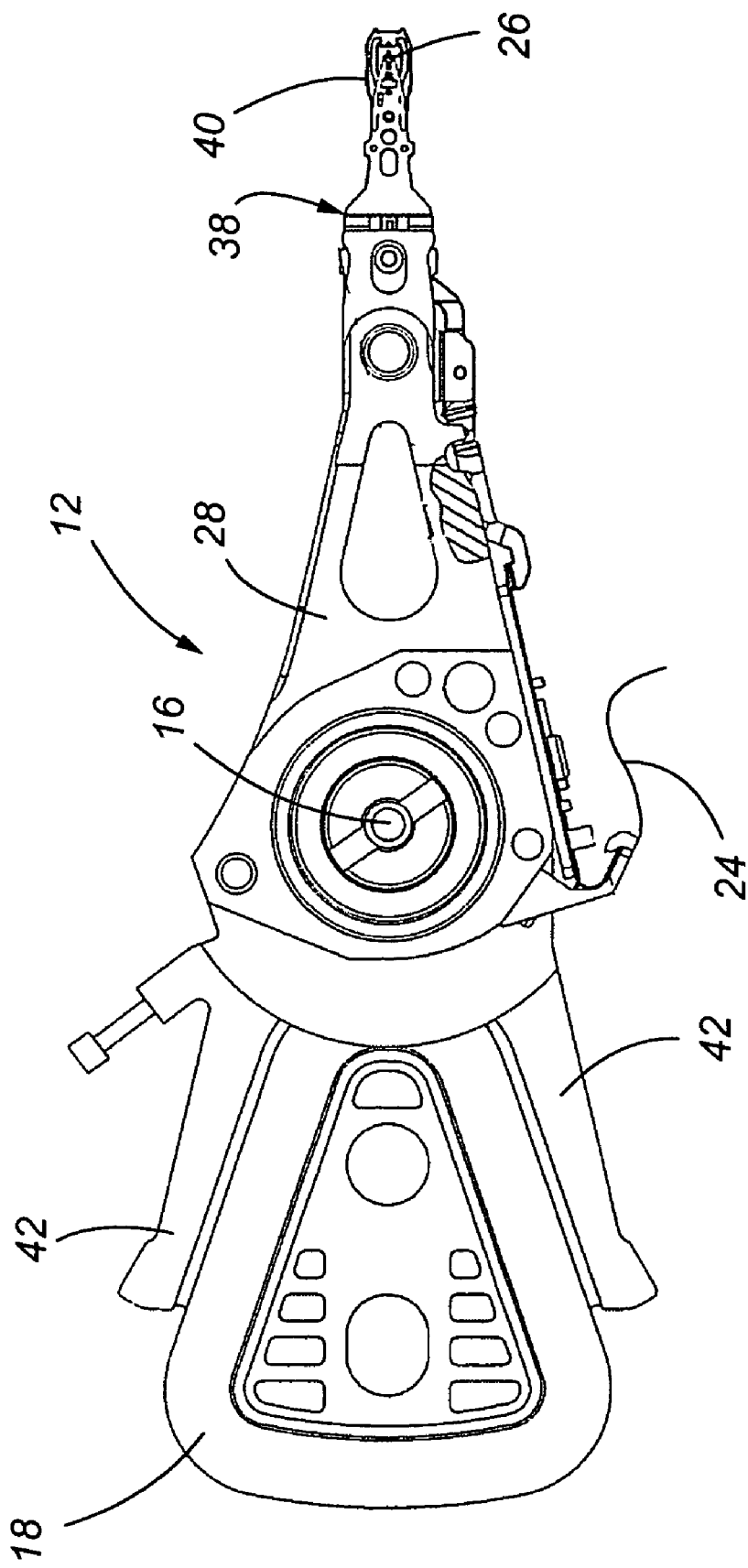
FIG. 2 is a top plan view of one embodiment of an actuator assembly showing the flex circuit connecting to the actuator arm.

Referring now to FIG. 2, a plan view of one embodiment of an actuator assembly 12 is shown. The actuator assembly 12 includes at least one actuator arm 28, a suspension or load beam 38, which is attached to the actuator arm 28 and a slider 40 attached to the distal end of the load beam. The transducer head 26 is attached to the slider. Also included are two arms 42 that form a yoke that secures a voice coil 18. The actuator assembly 12 rotates about a pivot assembly 16 that allows for the positioning of the transducer over desired tracks on the rotating memory disks 22 by varying electric current through the voice coil 18. The present invention is designed to interface with the flex circuit 24 such that vibrations generated by its movement, caused by movement of the actuator assembly, are dampened. This is accomplished by decreasing the amplitude of flex circuit vibration and/or decreasing its first mode natural frequency. The resultant benefit is a decrease in the post seek oscillation (PSO) of the head 26.

Figure 3:
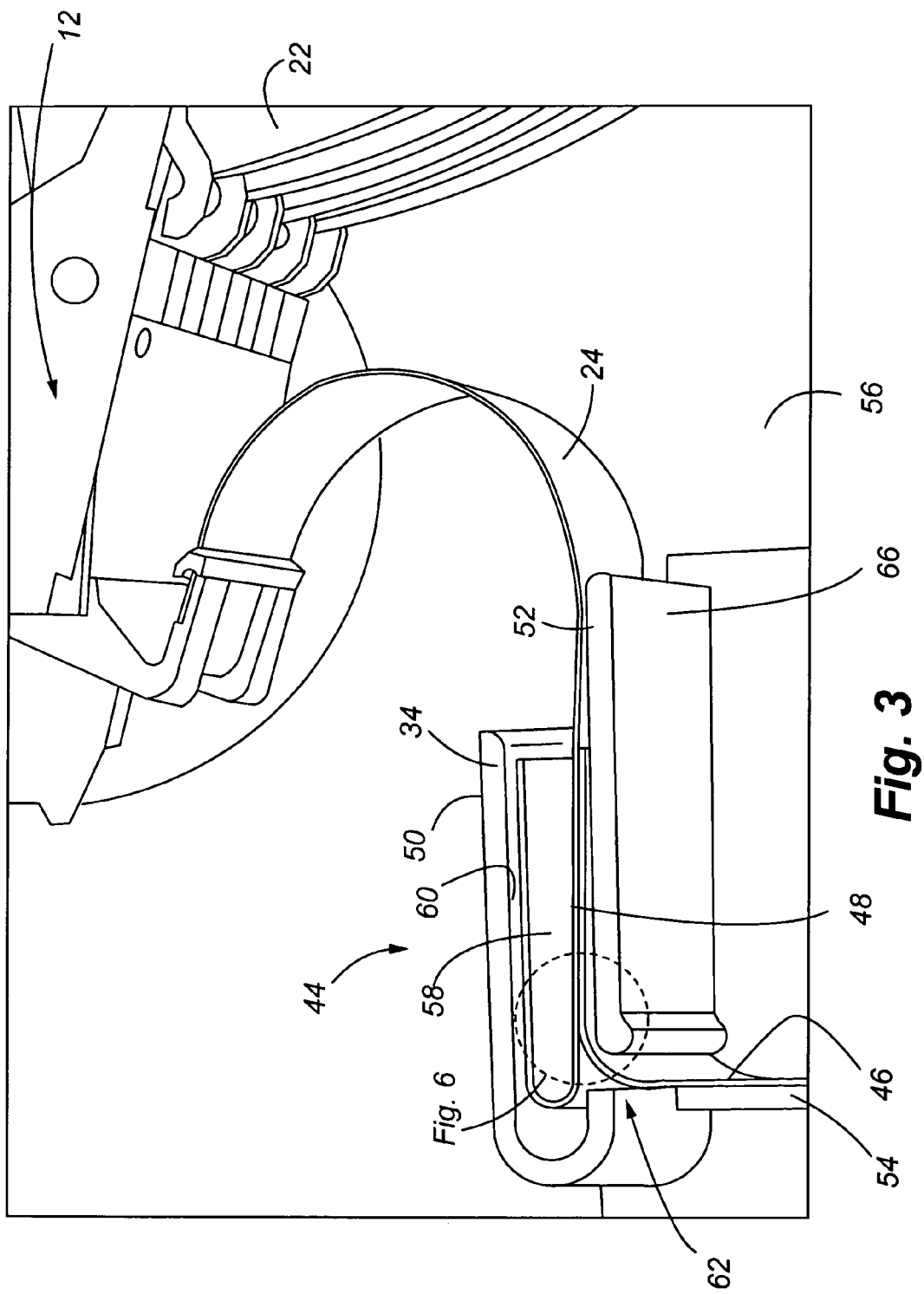
FIG. 3 is a partial perspective view of a 90° flex circuit dampener interconnected to a flex circuit clamp, and also showing the flex circuit extending to and interconnecting with another embodiment of an actuator assembly.

As illustrated in FIG. 3, the flex circuit 24 travels in a serpentine or arcuate path between the actuator assembly 12 and the flex clamp 34. Sufficient slack is provided in the flex circuit to allow the actuator assembly to fully rotate. The flex circuit 24 is generally a composite material composed of a matrix that contains a plurality of conductors or traces. More specifically, within the flex circuit 24, electrical conductors necessary for the transfer of data and power are embedded. The numbers and size of the traces contribute to the stiffness of the flex circuit. The flex circuit 24 also has specific material properties based on its composite construction. As a result, movement of the flex circuit during seek operations will cause vibrations that ultimately affect post seek oscillation performance of the disk drive.

Referring now to FIG. 3, one embodiment of the flex circuit dampener 44 is shown. More specifically, the 90° flex circuit dampener 44 is generally a bent piece of semi-rigid material. The material may be metal, such as stainless steel, or a polymer, such as Kapton or Mylar. In this embodiment, the flex circuit dampener 44 is L-shaped with a first leg 46 positioned generally perpendicular to a second leg 48. The dampener has an area of about 10 millimeters by 35 millimeters, and a thickness of about 75 microns. The flex circuit 24 and the flex circuit dampener 44 are both connected to the flex circuit clamp 34, although persons of skill in the art will appreciate that the flex circuit dampener 44 may connect to different structures than the flex clamp 34 or that the flex circuit clamp 34 may have different configurations, provided the flex circuit dampener 44 engages the flex circuit as described herein. In this embodiment, the flex clamp 34 includes a first clamp wall 50, a second clamp wall 52 and a third clamp wall 54. Each of the three clamp walls is disposed generally perpendicular to the floor 56 of the base plate 14. The first clamp wall 50 and second clamp wall 52 are generally parallel with a gap or slot 58 formed between them. One end of the flex circuit 24, which in one sense is a ribbon-like structure, is mechanically and electrically attached to an inside surface 60 of the first clamp wall 50. The first clamp wall 50 contains electrical connectors (not shown) that interconnect the flex circuit to a printed circuit board (not shown). From its connection to the surface 60 of the first clamp wall 50, the flex circuit 24 bends back on itself, passes along the second clamp wall 52 and extends to the actuator assembly 12.

The flex circuit dampener 44 is attached to the third clamp wall 54. The third clamp wall 54 is positioned generally perpendicular to the first and second clamp walls 50, 52. A second slot or gap 62 is formed where the first, second and third clamp walls generally merge. The first leg 46 of the dampener 44 is secured to a surface 64 of the third clamp wall 54 and the second leg 48, positioned generally perpendicular to the first leg 46 extending through the slot 62 and is positioned between the flex circuit 24 and the second clamp wall 52. This is illustrated in more detail in FIG. 6.

The flex circuit dampener 44 is designed to engage the flex circuit 24 and to deflect the flex circuit such that it will preload the flex circuit dampener 44, thus creating a spring mechanism that dampens displacement of the flex circuit 24. The flex circuit dampener 44 may be interconnected to the flex circuit clamp 34 in various ways, such as with fasteners, adhesives, or manufactured therewith in a molded plastic assembly that clips in place. One skilled in the art will appreciate that the present invention may be readily retrofit into many existing disk drives, since it is easily positioned within the space between the flex circuit 24 and one or more clamp walls.

Figure 4:
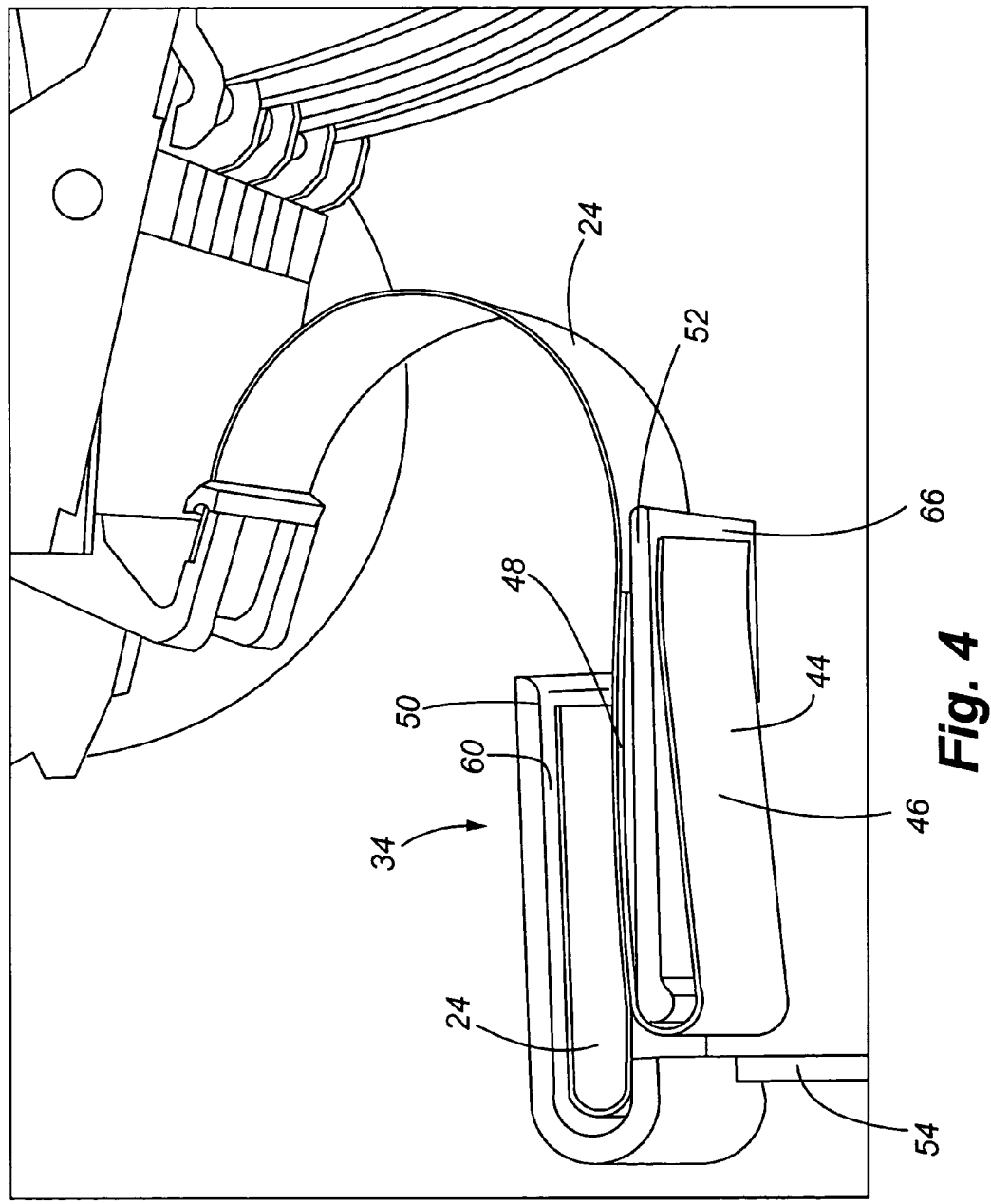
FIG. 4 is a partial perspective view of a 180° flex circuit dampener interconnected to a flex circuit clamp, and also showing the flex circuit extending to and interconnecting with another embodiment of an actuator assembly.

Referring now to FIG. 4, an alternate embodiment of the flex circuit dampener 44 is shown. More specifically, this embodiment of the present invention is very similar to that described above, however, the flex circuit dampener 44 of this embodiment is folded at approximately 180 degrees. As shown, the first leg portion 46 of the flex circuit dampener 44 is interconnected to an outer surface 66 of the second clamp wall 52. The third clamp wall 54 of the previous embodiment may be eliminated. The flex circuit dampener 44 then extends around the second clamp wall 52 and back towards itself, where the second leg 48 is situated between the second clamp wall 52 and the flex circuit 24. The flex circuit 24 is attached in the same manner as described with respect to the previous embodiment.

Figure 5:
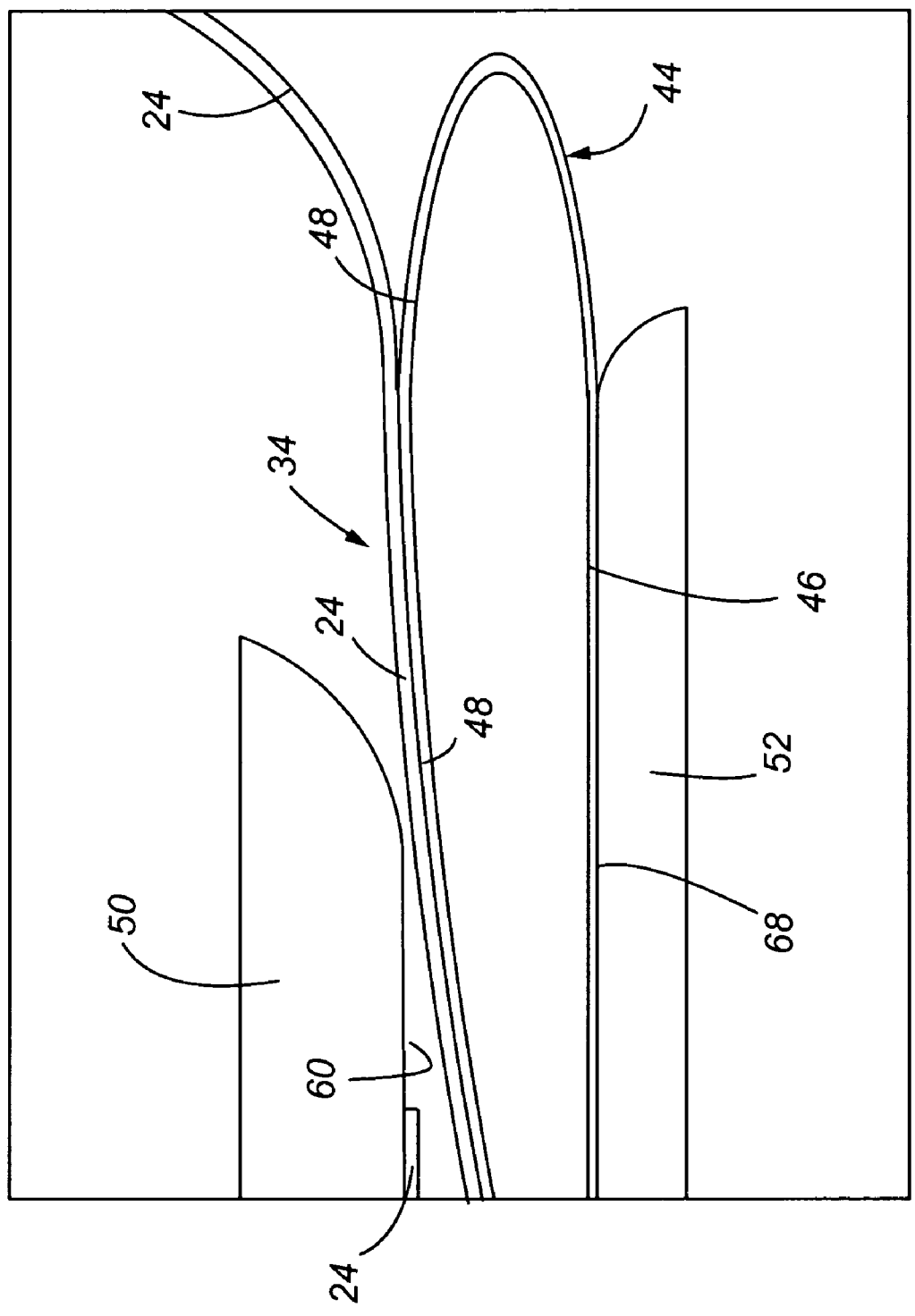
FIG. 5 is a top plan view of a wedge flex circuit dampener interconnected to a flex circuit clamp.

Referring now to FIG. 5, yet another embodiment of the flex circuit dampener 44 is shown. This embodiment of the present invention is similar to that shown in FIG. 4, however, the placement of the dampener is slightly different. As shown, the first leg 46 of the flex circuit dampener is interconnected to the inner surface 68 of the second clamp wall 52. The flex circuit dampener 44 is folded back towards itself to form a wedge wherein the second leg 48 of the flex circuit dampener 44 is positioned between the first leg 46 of the flex circuit dampener 44 and the flex circuit 24. The flex circuit 24 is connected to the first wall 50 of the flex clamp 34 as in the prior embodiments shown in FIGS. 3 and 4. The flex circuit 24 contacts the second leg 48 of the flex circuit dampener 44, and then travels to the actuator assembly 12.

Figure 6:
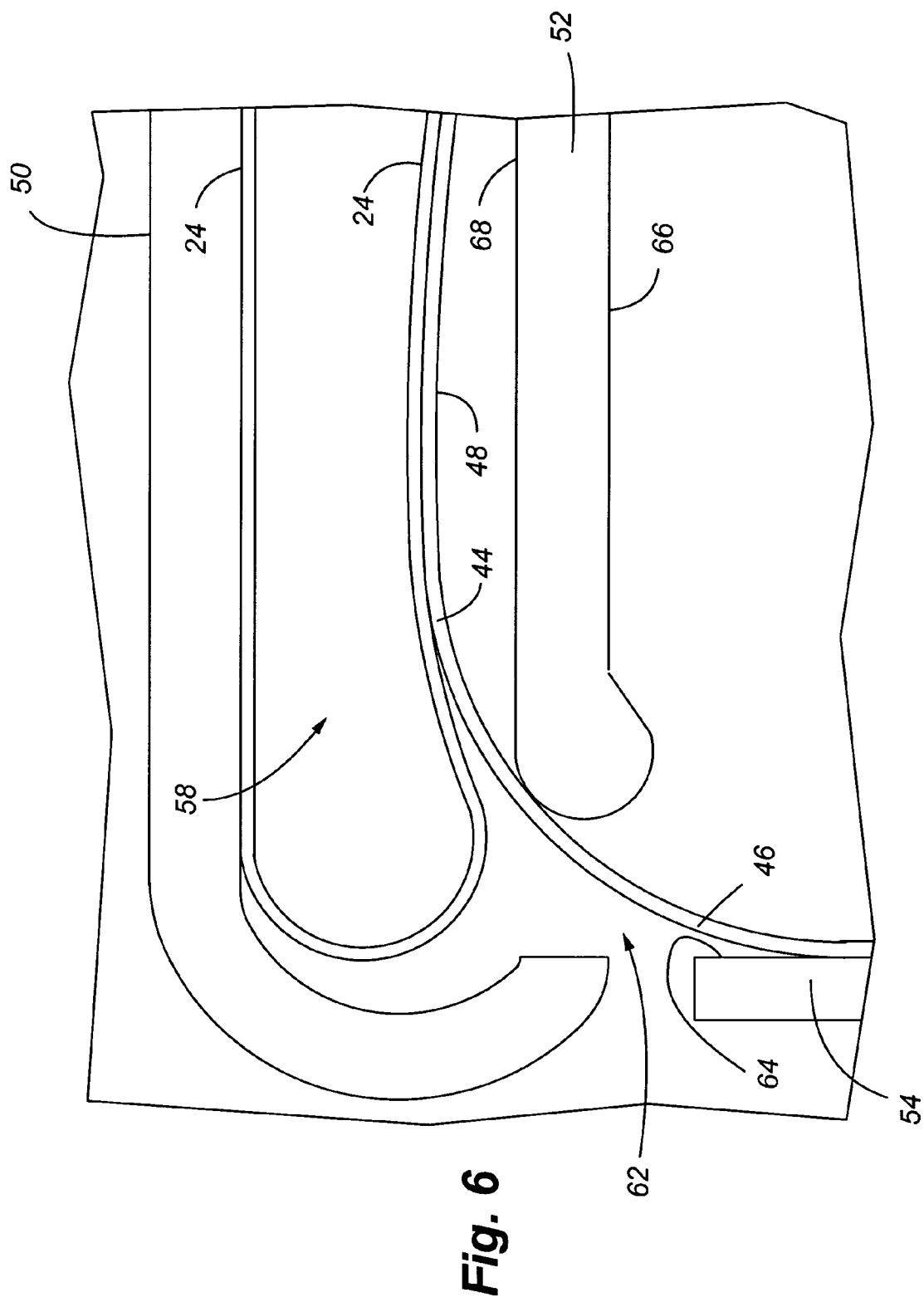
FIG. 6 is a detailed top plan view taken from area A of FIG. 3 showing engagement between the flex circuit and one embodiment of the flex circuit dampener.

Referring now to FIG. 6, a detailed view of the engagement or contact between the flex circuit 24 and the flex circuit dampener 44 is shown. It has been found that a flex circuit dampener 44 of about the same stiffness of the flex circuit 24 is desirable. In addition, to increase the amount of frictional, or coulomb dampening, it has been found that the amount of contact between the lengths of the two components is important. More specifically, as contact between the flex circuit 24 and the flex circuit dampener 44 is maximized, more surface area interaction is available for coulomb dampening. In addition, as stiffness of the flex circuit dampener 44 approaches the stiffness of the flex circuit 24, the affect of the coulomb dampening increases such that the decay rate of the reaction force imparted by the flex circuit 24 onto the flex circuit dampener 44 is increased.

Referring now to FIGS. 7A and B, graphical depictions of the effects of the flex circuit dampener are shown. Referring specifically to FIG. 7A, the post seek oscillation behavior of a disk drive without a flex circuit dampener is shown that has a first resonant frequency of about 0.74 micro inches, at around 480 Hz. Now, with emphasis on FIG. 7B, after the flex circuit dampener of the embodiment of FIG. 3 is added to the disk drive, the amplitude decreases to about 0.38 micro inches, at about 250 Hz. Thus, the first resonant frequency has been reduced by approximately 48% and the magnitude of the vibration has been reduced by over 50%. One skilled in the art will appreciate that these graphs show exemplary data, different configurations of disk drives and dampeners therefore will produce different reactions to post seek oscillation. However, it should be understood that the present invention is designed, and has been shown, to reduce the magnitude and natural frequency of the post seek oscillation by altering the component of vibrations emanating from the flex circuit.

Figure 8B:
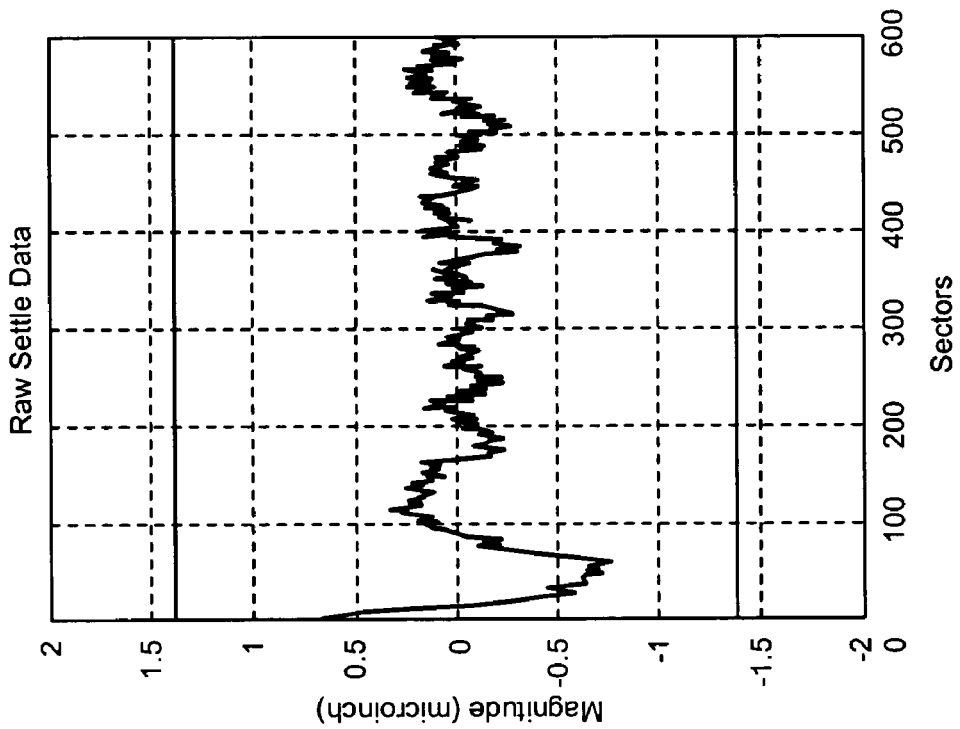
FIG. 8B is a graph that shows the effect that a dampener of the present invention has on post seek oscillations.
Figure 8A:
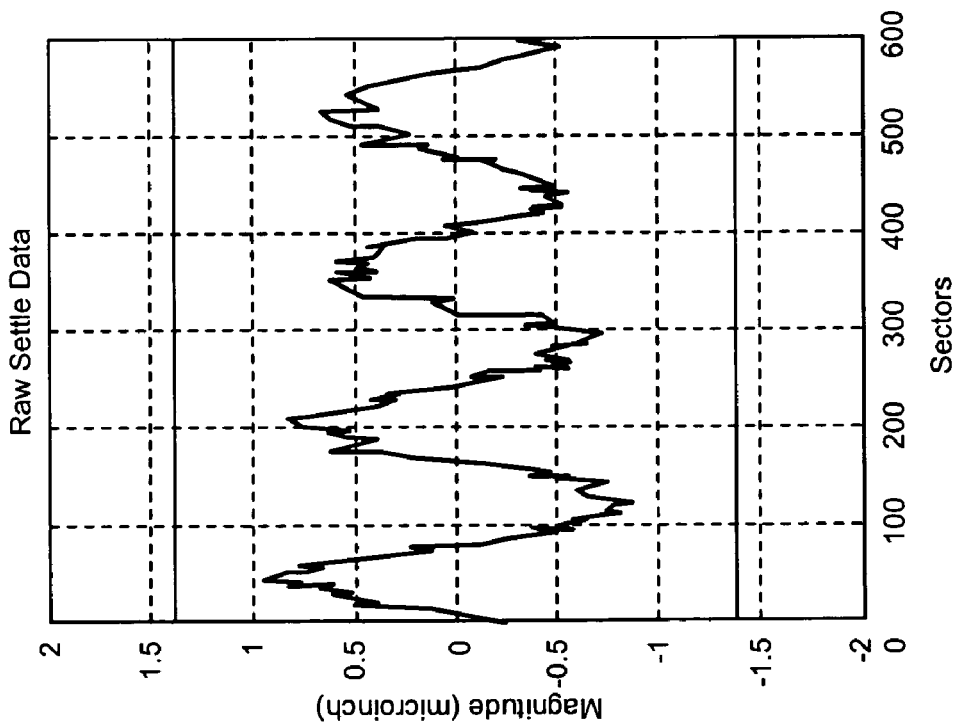
FIG. 8A is a graph that shows undampened post seek oscillations of an actuator head.

Referring now to FIGS. 8A and B, graphical representations of post seek oscillations or settle are shown. More specifically, the graphs show the magnitude of actuator head movement over time. The disk drive of FIG. 8A does not include a dampener, the disk drive of FIG. 8B does include a dampener of the type shown in FIG. 3. Comparing the graphs, one skilled in the art will appreciate that the head settles much more quickly with the dampener installed. Without the dampener the head moves about plus and minus 0.75 micro inches initially and these oscillations decrease slowly. In comparison, with reference to the dampened disk drive shown in FIG. 8B, the head also moves a magnitude of about plus and minus 0.75 micro inches initially, but the oscillations decrease more quickly than that of the embodiment of FIG. 8A, without a dampener, such that the oscillation of the head relative to the target track on the disk is reduced and thus is more quickly connected by the servo mechanisms of the disk drive.

Figure 9A:
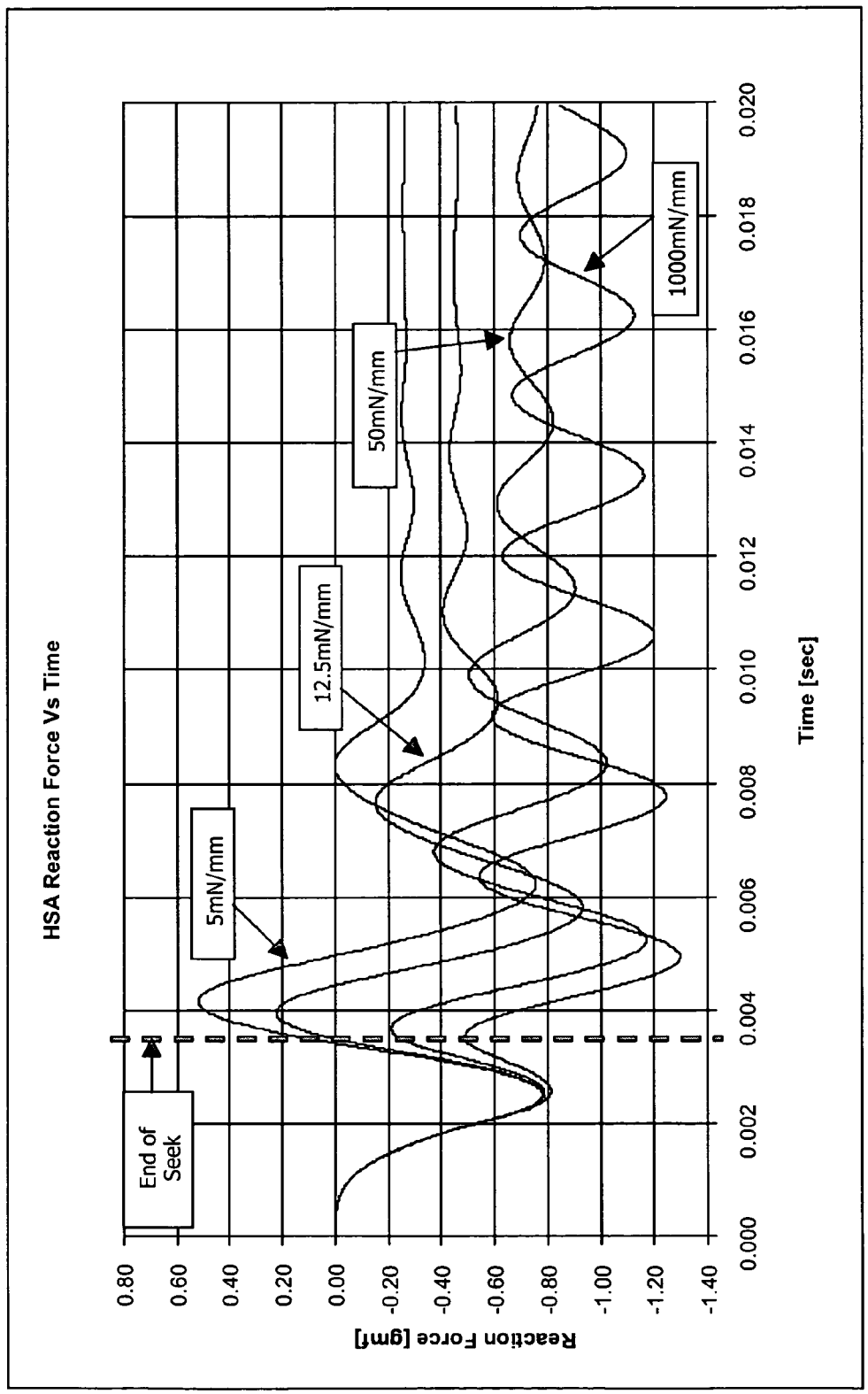
FIG. 9A is a graph showing a finite element analysis of the reaction force experienced by an actuator assembly over time by four dampeners of the present invention, each with a different stiffness, in combination with a flex circuit.
Figure 9B:
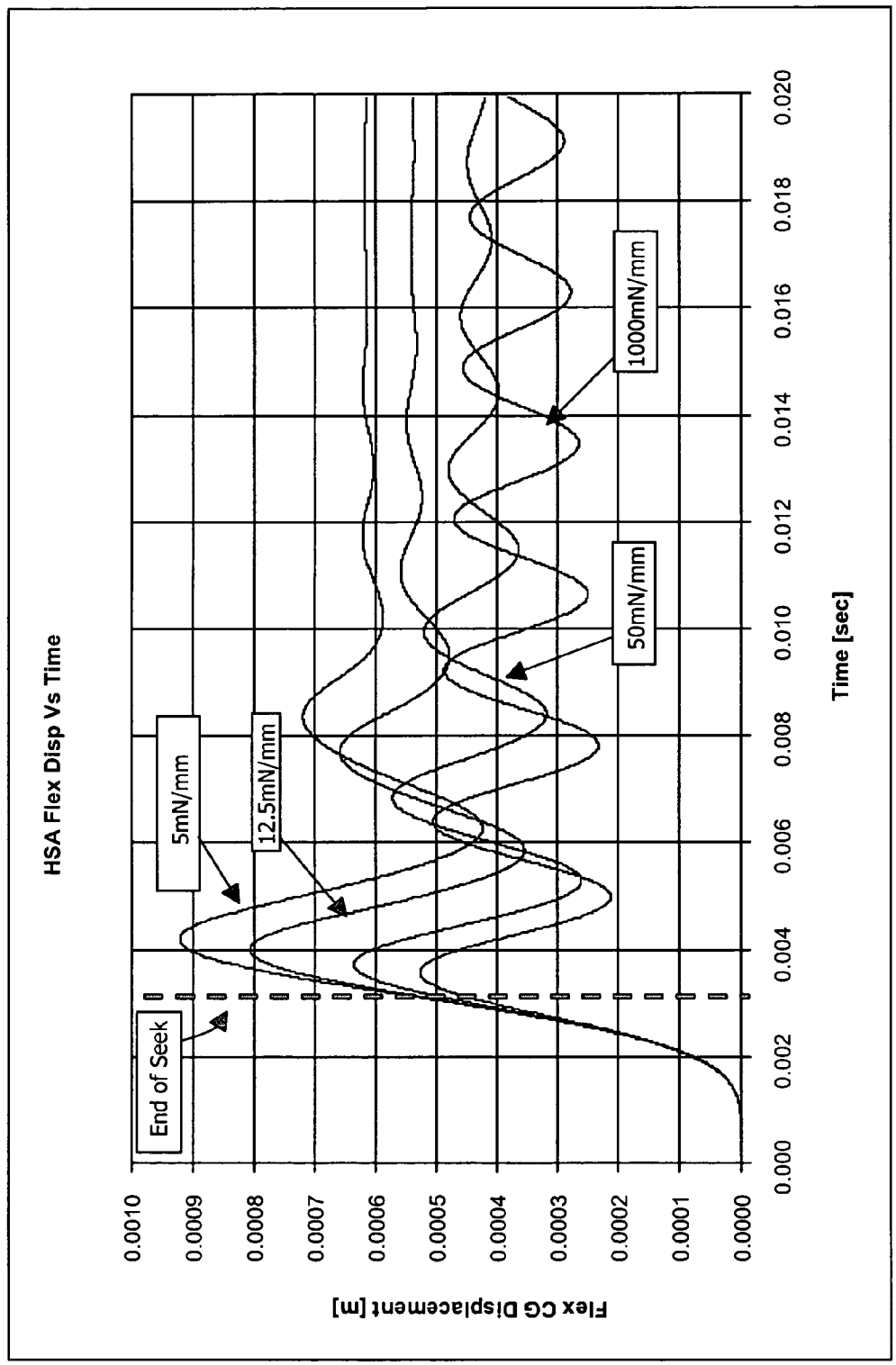
FIG. 9B is a graph showing a finite element analysis of the effect that four different dampeners of the present invention have on the displacement of the flex circuit versus time.

Referring to FIGS. 9A and 9B, a graphical representation of a finite element analysis of a disk drive containing a flex circuit dampener of the kind illustrated in FIG. 3 is shown. Each plot illustrates four different flex circuit dampeners, each having a different stiffness, namely: 5, 12.5, 50 and 1,000 milliNewtons per millimeter. FIG. 9A is a plot of the reaction force on the actuator assembly in grams force versus time. FIG. 9B is a plot of the same four flex circuit dampeners, but showing displacement of the flex circuit versus time. Both FIGS. 9A and 9B take into account the effects of coulomb friction. A dampener with a stiffness of 1,000 milliNewtons per millimeter is analogous to a rigid wall. Thus, as can generally be seen, positive results begin to occur with a dampener having a stiffness of approximately 50 milliNewtons per millimeter.

Figure 10:
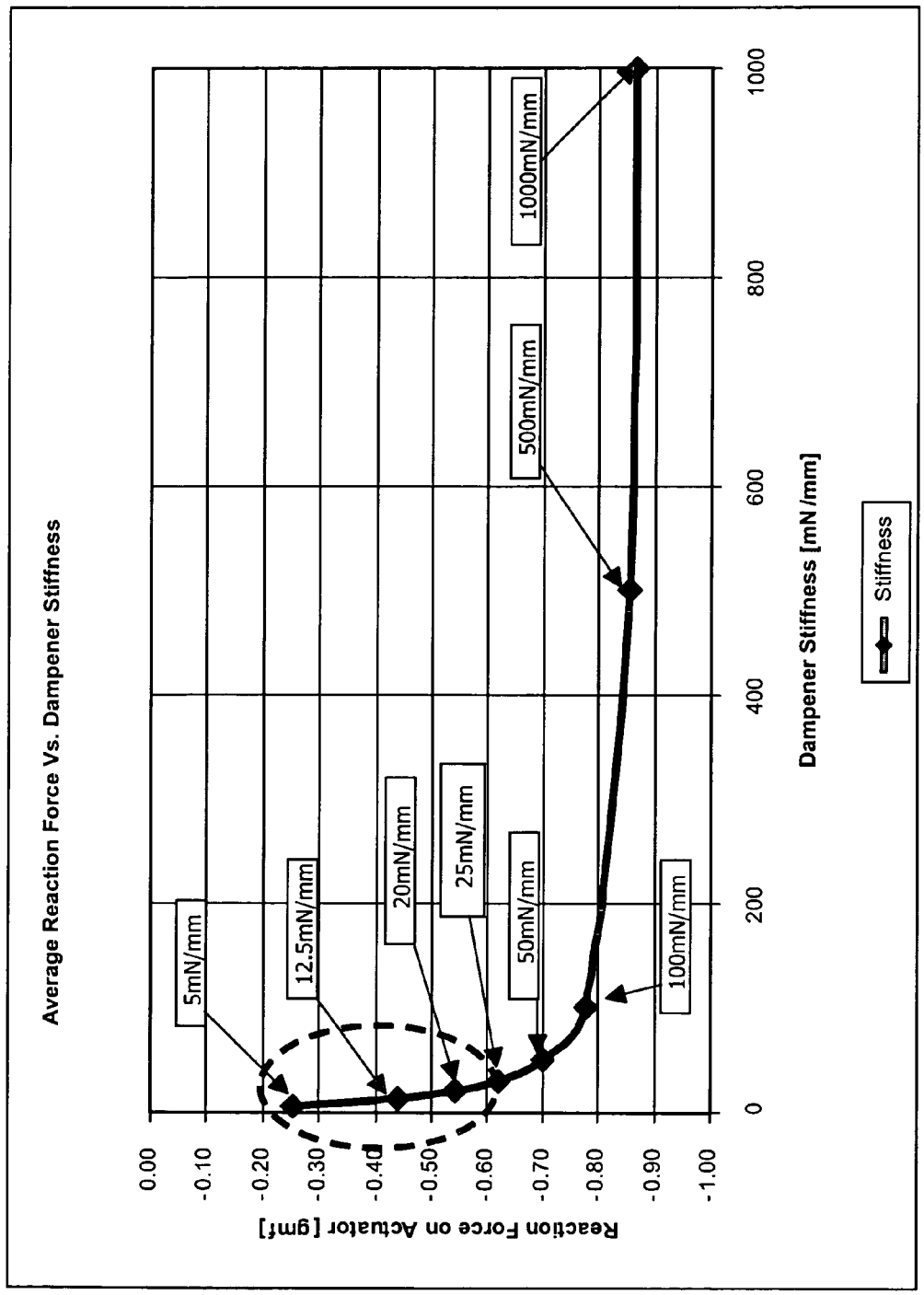
FIG. 10 is a graph showing the average reaction force experienced by an actuator assembly by a dampener of the present invention as the stiffness of the dampener is changed.

FIG. 10 is a plot of a finite element analysis of the average reaction force of an actuator assembly versus dampener stiffness. In this analysis, the flex circuit had a stiffness of 12.5 milliNewtons per millimeter. The highlighted oval shows that the flex dampener is most effective in reducing the force of the flex circuit on the actuator when the dampener stiffness is in the range of approximately 5 to 50 milliNewtons per millimeter. When the stiffness of the dampener and the flex circuit are the same (e.g., 12 milliNewtons per millimeter), the mean reaction force drops over 50% from that of a rigid clamp wall (1,000 milliNewtons per millimeter).

Preferably, the dampener of the present invention is manufactured of Kapton with a range of thickness of about 0.001-0.003 inches. The thickness is dependent primarily upon the stiffness of the flex circuit 24. However, one skilled in the art will appreciate that any stiffness of material may be used without departing from the scope of the invention. Overall, it is preferred that the stiffness of the dampener be in the range of between about 5 milliNewtons per millimeter and 50 milliNewtons per millimeter. The simplicity of the invention allows it to be easily retrofittable into many disk drives or installed into new disk drives.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A hard disk drive, comprising:
a base plate having a first side and a second side;
at least one hard disk mounted for rotary movement relative to said base plate, said at least one disk containing a plurality of tracks capable of containing data;
an actuator assembly mounted for rotation relative to said at least one hard disk, said actuator assembly including at least one actuator arm having a distal end with at least one head element mounted proximate said distal end;
a printed circuit board mounted to said second side of said base plate;
a flex circuit electrically interconnecting said at least one head element and said printed circuit board; and
a dampening member having a first leg and a second leg, said first leg being secured to said base plate, said second leg engaging said flex circuit, the dampening member positioned in abutting relation with said flex circuit, wherein said first resonant mode of said flex circuit is reduced and the amplitude of post seek oscillations of said actuator arm are reduced.

2. The hard disk drive of claim 1, wherein when said second leg engages said flex circuit, said first and second legs are separated by an approximate ninety degree angle.

3. The hard disk drive of claim 1, wherein the stiffness of the flex circuit and the dampening member are substantially the same.

4. The hard disk drive of claim 3, wherein the stiffness is in the range of to 50 microNewtons per millimeter.

5. The hard disk drive of claim 1, wherein the stiffness of the flex circuit is 12.5 microNewtons per millimeter.

6. The hard disk drive of claim 5, wherein the stiffness of the dampening member is approximately 12.5 microNewtons per millimeter.

7. The hard disk drive of claim 1, wherein said dampening member is secured to and extends from a securing member affixed to said base plate.

8. The hard disk drive of claim 7, wherein said dampening member comprises an elongate member having a first end and a second end, said first end is secured to said securing member and said second end is cantilevered from said securing member.

9. The hard disk drive of claim 7, further comprising a flex clamp secured to said base plate, where said flex circuit comprises a first end and a second end, said first end of said flex circuit secured to said flex clamp and the second end of said flex circuit secured to said actuator assembly.

10. The hard disk drive of claim 1, wherein said dampening member comprises a spring.

11. The hard disk drive of claim 1, wherein the dampening member is made of a polymer.

12. The hard disk drive of claim 11, wherein said dampening member is between approximately 0.001 and 0.003 inches thick.

13. The hard disk drive of claim 1, wherein said first leg and said second leg are separated by an approximately one hundred and eighty degree angle.

14. The hard disk drive of claim 1, wherein said dampening member comprises a thin elongate member having a first side and a second side, and wherein said dampening member is folded such that said first side faces itself and said second side engages said flex circuit.

15. The hard disk drive of claim 1, wherein said first leg and said second leg are substantially perpendicular to each other.

16. The hard disk drive of claim 1, wherein said first leg and said second leg are substantially parallel to each other.

17. A method for making a hard drive, comprising:
providing a base plate with a first side and a second side;
mounting at least one hard memory disk mounted to a base plate such that the at least one hard memory disk rotates relative to said base plate;
mounting an actuator assembly to said base plate such that it rotates relative to said at least one disk;
connecting a flex circuit to said actuator assembly;
contacting said flex circuit with a dampening member, the dampening member being a thin elongate member having a first end and a second end;
securing the first end of the thin elongate member to a first surface; and
positioning the second end of the thin elongate member in contact with said flex circuit.

18. The method of claim 17, further comprising providing a head on said actuator assembly and conducting a seek operation, wherein upon rotation of said actuator assembly, said dampening member lowers the frequency of the first resonant mode of the flex circuit.

19. The method of claim 17, wherein following a track seek operation, said dampening member lowers the magnitude of post seek oscillations of said actuator assembly.

20. The method of claim 17, further comprising providing a securing member having a first surface and a second surface, wherein securing the first end of the thin elongate member to a first surface comprises securing the first end of the dampening member to the first surface of the securing member, and wherein positioning the second end of the thin elongate member in contact with sad flex circuit comprises extending the second end of the dampening member away from the first surface of the securing member.

21. The method of claim 17, further comprising folding said dampening member to create a first portion and a second portion.

22. The method of claim 21, further comprising securing said first portion to the first surface and engaging said flex circuit with said second surface.

23. The method of claim 21, wherein said dampening member has a first surface and a second surface, and further comprising folding said dampening member such that said first surface of said first portion faces said first surface of said second portion and wherein said second surface of said second portion engages the flex circuit.

24. A method for dampening vibrations caused by movement of a flex circuit in a hard disk drive, comprising:
   providing a hard disk drive having at least one rotating hard memory disk with multiple tracks for holding data, an actuator assembly including at least one actuator arm extending outwardly from a pivot and one transducer positioned at the distal end of said actuator arm, said actuator assembly rotatable relative to said at least one disk to position the transducer over the tracks on said disk, flex circuit attached to said actuator assembly, and a securement surface in said disk drive;
   positioning a dampening member in contact with said flex circuit, said dampening member being an elongate flexible member having a first end and a second end, wherein positioning said dampening member comprises engaging said flex circuit with said second end of said elongate flexible member;
   attaching said first end of said elongate flexible member to said securement surface; and
   whereby, upon conducting a seek operation, the dampening member lowers the first resonant mode frequency of the flex circuit.

25. The method of claim 24, wherein following a track seek operation, said dampening member lowers the magnitude of post seek oscillations of said actuator assembly.

26. The method of claim 24, wherein positioning a dampening member in contact with said flex circuit comprises engaging a length of the flex circuit with said dampening member.

27. The method of claim 24, further comprising selecting a dampening member having a stiffness that approximates the stiffness of the flex circuit.

28. The method of claim 27, wherein the stiffness of the dampening member is in the range of 5 to 50 microNewtons per millimeter.

29. The method of claim 24, wherein positioning said dampening member in contact with said flex circuit comprises folding said dampening member.

30. A method for dampening vibrations caused by movement of a flex circuit in a hard disk drive, the method comprising:
   providing a hard disk drive having at least one rotating hard memory disk with multiple tracks for holding data, an actuator assembly including at least one actuator arm extending outwardly from a pivot and one transducer positioned at the distal end of said actuator arm, said actuator assembly rotatable relative to said at least one disk to position the transducer over the tracks on said disk, and a flex circuit attached to said actuator assembly, and a securement surface in said disk drive;
   positioning a dampening member in contact with said flex circuit, said dampening member being an elongate flexible member having a first end and a second end, wherein positioning said dampening member in contact with said flex circuit comprises bending said dampening member;
   attaching said first end of said elongate flexible member to said securement surface; and
   whereby, upon conducting a seek operation, the dampening member lowers the first resonant mode frequency of the flex circuit.

* * * * *